United States Patent
Renken et al.

(10) Patent No.: US 7,551,400 B2
(45) Date of Patent: Jun. 23, 2009

(54) HEAD SUSPENSION WITH VIBRATION DAMPING FOR A DATA STORAGE DEVICE

(75) Inventors: Frederick Paul Renken, Boulder, CO (US); Brian Dean Hammel, Eagen, MN (US); Shri Hari Narayan, Minneapolis, MN (US); Dave Paul McReynolds, Loveland, CO (US); Sandeepan Bhattacharya, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 387 days.

(21) Appl. No.: 10/758,390

(22) Filed: Jan. 15, 2004

(65) Prior Publication Data
US 2005/0157427 A1 Jul. 21, 2005

(51) Int. Cl.
*G11B 5/48* (2006.01)

(52) U.S. Cl. .................................... 360/244.9

(58) Field of Classification Search ............... 360/244.9, 360/244.2
See application file for complete search history.

(56) References Cited

U.S. PATENT DOCUMENTS

| | | | |
|---|---|---|---|
| 5,771,135 A * | 6/1998 | Ruiz et al. ............... | 360/244.3 |
| 5,796,553 A | 8/1998 | Tangren | |
| 5,801,905 A | 9/1998 | Schirle et al. | |
| 5,825,590 A | 10/1998 | Ohwe | |
| 6,005,750 A | 12/1999 | Willard et al. | |
| 6,115,220 A * | 9/2000 | Khan et al. ............... | 360/244.2 |
| 6,212,043 B1 | 4/2001 | Nakamura et al. | |
| 6,271,996 B1 | 8/2001 | Houk et al. | |
| 6,353,515 B1 | 3/2002 | Heim | |
| 6,522,624 B2 * | 2/2003 | Budde ...................... | 360/294.3 |
| 6,778,362 B1 * | 8/2004 | Davis et al. ............... | 360/244.8 |
| 6,798,618 B2 * | 9/2004 | Takagi et al. .............. | 360/244.5 |
| 2002/0012184 A1 | 1/2002 | Himes et al. | |
| 2002/0141114 A1 * | 10/2002 | Wittig et al. ............. | 360/244.9 |
| 2003/0039074 A1 | 2/2003 | Erpelding | |

* cited by examiner

*Primary Examiner*—Tianjie Chen
(74) *Attorney, Agent, or Firm*—Fellers, Snider, et al.

(57) ABSTRACT

An apparatus, method and combination for dissipating vibration from a head suspension of a data storage device. The combination includes a rotating disc in a data exchange relationship with a read/write head supported by a head suspension formed by the method. The method includes the steps of; forming a mounting region and a load beam region each adjacent a bend region; removing material from the bend region to form an aperture, a strut, an isolation aperture and a damping material support structure; and affixing a damping material to the strut and the damping material support structure. The apparatus includes the bend region adjacent both the mounting region and the load beam region, with the damping material attached to the strut as well as to the damping material support structure. The load beam region includes a rigid portion, which supports a flexure upon which a read/write head is attached.

18 Claims, 2 Drawing Sheets

HEAD SUSPENSION WITH VIBRATION DAMPING FOR A DATA STORAGE DEVICE

FIELD OF THE INVENTION

The invention relates to the field of data storage devices. More particularly, but not by way of limitation, this invention relates to a combination and method for dissipating excitation experienced by components in a data storage device.

BACKGROUND

One key component of any computer system is a device to store data. One common type of data storage device is a disc drive. The most basic parts of a disc drive are an information storage disc that is rotated, an actuator that moves a read/write head (head) to various locations over the substantially concentric data tracks of a disc, and electrical circuitry used for encoding data so that the data can be successfully retrieved and written to the disc surface. A microprocessor controls most of the operations of the disc drive including passing requested data read by the transducer to the computer system and receiving data from the computer system for storage on the disc.

A problem associated with disc drives is vibrations at certain frequencies, which causes the head to move off a designated data track. In other words, if there is even a slight vibration, the head may move away from the center of the designated data track, causing data to be misread or causing a failure to properly write data. One source of vibration results from a seek operation that excites head suspensions, which in turn causes the head to vibrate. The vibration causes run-out, i.e., an off-track motion, and off-track motion becomes more acute as the density of the data tracks increase. As such, challenges remain and a need persists for improvements in methods and apparatus to reduce vibrations in head suspensions for data storage devices.

SUMMARY OF THE INVENTION

In accordance with preferred embodiments, a method, apparatus and combination are provided for dissipation of vibrations experienced by a read/write head of a data storage device. The combination includes a rotating disc in a data exchange relationship with a read/write head, which is supported by a head suspension formed by steps for forming the head suspension.

In one aspect, the method includes forming a mounting region of the head suspension adjacent a bend region, forming a load beam region adjacent the bend region, and removing material from the bend region to form a strut and a damping material support structure. The method preferably continues with the steps of severing the strut from the damping material support structure to provide an isolation aperture and a base portion of the damping material support structure. A damping material is preferably affixed to the strut and the damping material support structure, wherein the damping material partially obstructs the isolation aperture.

In another aspect, an apparatus comprising a head suspension that preferably includes a mounting region that has a mounting aperture with an attachment member secured adjacent the mounting aperture, and a bend region with an aperture bounded by a number of struts. The struts regulate an amount of spring force imparted to a read/write head. The apparatus further preferably includes a load beam region with a damping material support structure adjacent a bend member, the damping material support structure is offset from the struts and extends into the aperture.

Preferably, the load beam region includes a proximal end adjacent the bend region and a distal end with a rigid portion. The distal end extends from the proximal end and a flexure is preferably affixed to the rigid portion to support the read/write head. Preferably, the damping material support structure extends into the aperture from the proximal end of the load beam to allow an adhesion of the damping material to the struts while minimizing potential exposure of the read/write head and the disc to an adhesive medium of the damping material.

These and various other features and advantages that characterize the claimed invention will be apparent upon reading the following detailed description and upon review of the associated drawings.

DETAILED DESCRIPTION

Figure 1:
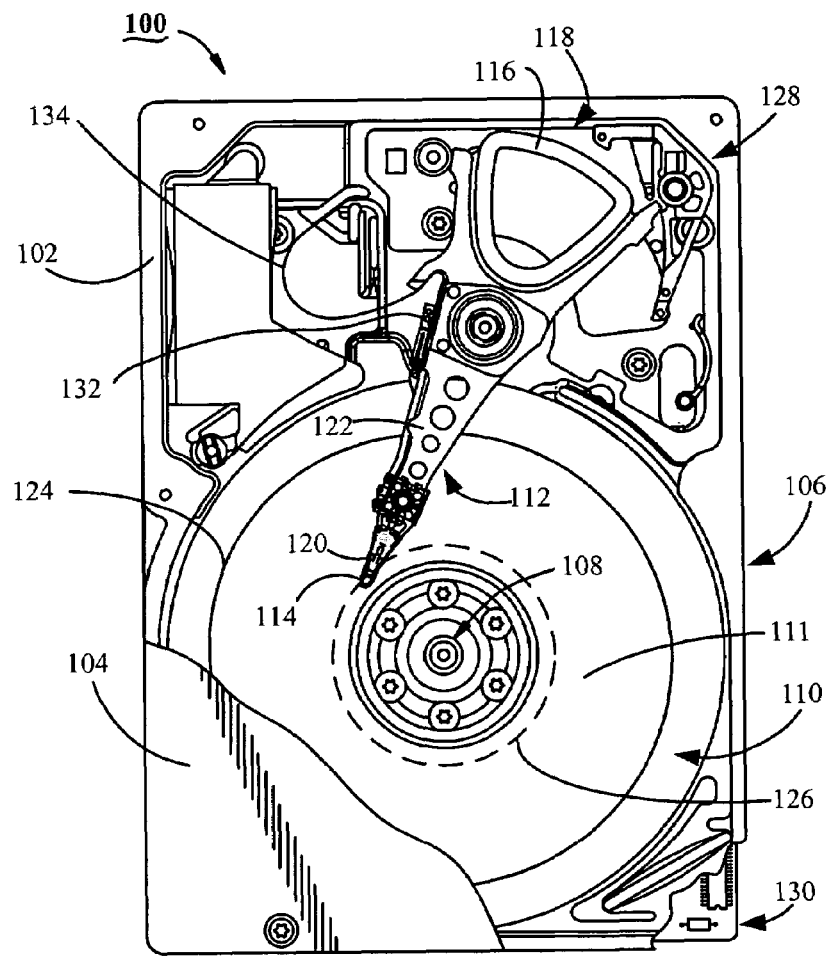
FIG. 1 is a partial cutaway top plan view of a data storage device (DSD) that incorporates a head suspension of the present invention.

Referring now to the drawings, FIG. 1 provides a top plan view of a data storage device (DSD) 100. The DSD 100 includes a base deck 102 cooperating with a top cover 104 (shown in partial cutaway) to form a sealed housing for a mechanical portion of the DSD 100, referred to as a head-disc assembly 106.

A spindle motor assembly 108 rotates a number of data storage discs 110 with a magnetic recording surface 111 at a substantially constant operational speed. An actuator assembly (actuator) 112 supports and rotates a number of read/write heads (heads) 114 adjacent the magnetic recording surfaces 111 when current is applied to a coil 116 of a voice coil motor (VCM) 118. A head suspension 120 provides a predetermined spring force on the head 114 to maintain a proper data exchange relationship between the head 114 and the disc 110 during operation of the DSD 100. Additionally, the head suspension 120 serves to connect the head 114 with an actuator arm 122 of the actuator 112.

During operation of the DSD 100, the actuator 112 moves the heads 114 into a data exchange relationship with the disc 110, i.e., the actuator 112 moves the heads to data tracks 124 on the surfaces 111 to write data to and read data from the discs 110. When the DSD 100 is deactivated, the actuator 112 positions the heads 114 adjacent a home position 126 and the actuator 112 is confined by latching a toggle latch 128.

Command, control and interface electronics for the DSD 100 are provided on a printed circuit board assembly 130 mounted to the head-disc assembly 106. During data transfer operations, a preamplifier/driver (preamp) 132 attached to a flex circuit 134 conditions read/write signals conducted by the flex circuit 134 between the printed circuit board assembly 130 and the heads 114.

Figure 2:
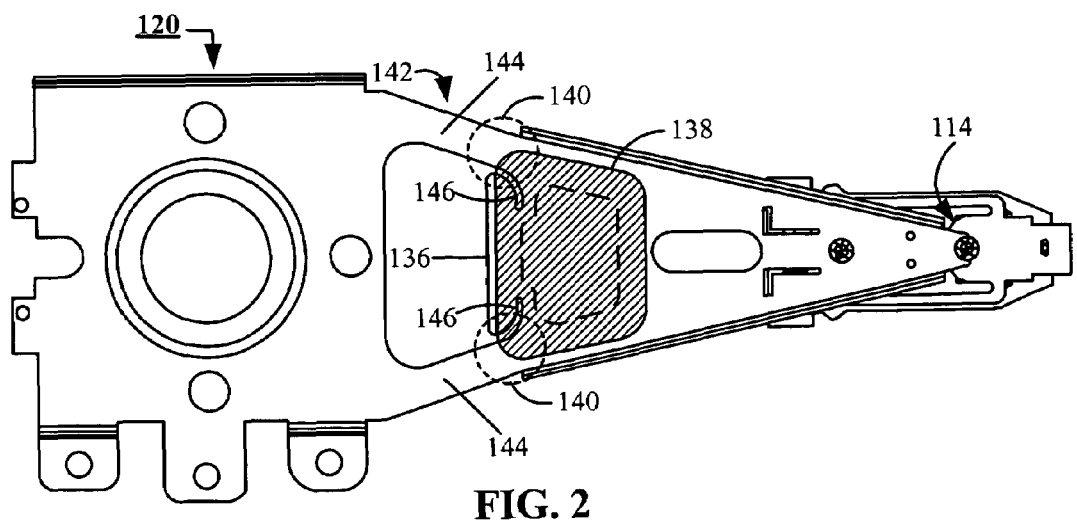
FIG. 2 is a top plan view of the head suspension of FIG. 1.

FIG. 2 shows a preferred embodiment of the head suspension 120, which includes a damping material support structure 136. The damping material support structure 136 allows a large damping material 138 to be applied in a high strain area 140, without undue exposure of an adhesive (not shown)

of the damping material 138 or damage to a bend region 142 of the head suspension 120. The large damping material 138, enabled by the damping material support structure 136, helps to dissipate undesirable resonant vibrations in the head suspension 120.

In a preferred embodiment, the bend region 142 has a pair of bend members (also referred to herein as struts) 144 used to achieve a desired spring rate and load for the head 114. As a result, the strain energy for most resonant modes is highest in the high strain area 140 of the struts 144. Dampers are most effective in areas of high strain and the damping material support structure 136 promotes a cost effective application of damping to the struts 144. Because of the preferred embodiment configuration of the damping material support structure 136, ease in manufacturing of the damping material 136 results, due to its relatively large surface area. The relatively large surface area of the damping material 136 further provides the benefit of enhancing an accurate placement and application of the damping material 136 to the bend region 142 during the assembly process of the DSD 100 (of FIG. 1).

An adhesive medium is preferably used to affix the damping material 138 to the struts 144 and to the damping material support structure 136. Excessive adhesive exposure may cause difficulties with handling the actuator 112 (of FIG. 1), and may further outgas particles into the head-disc assembly 106 (of FIG. 1), which can damage the disc 110 (of FIG. 1) or the head 114. The damping material support structure 136 minimizes adhesive exposure, without affecting performance of the struts 144. Preferably, adhesive exposure is minimized because the damping material support structure 136 supports the large damping material 138 and substantially covers the exposed adhesive area of the large damping material 138.

FIG. 2 also shows a preferred isolation aperture 146, i.e., a thin space between the damping material support structure 136 and the struts 144 to maintain suspension performance, but still provide access to the high strain area 140 on the struts 144 for application of the damping material 138.

Figure 3:
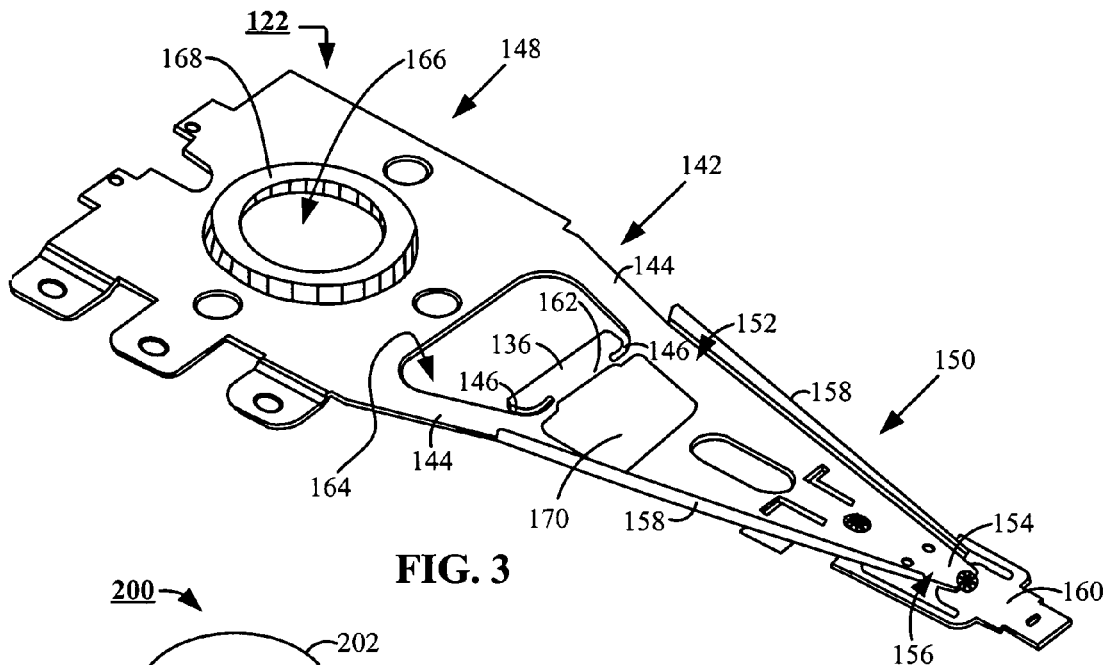
FIG. 3 is a top perspective view of the head suspension of FIG. 2.

FIG. 3 shows a mounting region 148 adjacent the bend region 142. FIG. 3 also shows a load beam region 150 with a proximal end 152 adjacent the bend region 142. The load beam region 150 preferably includes a rigid portion 154 on a distal end 156 and a preferential stiffening rail 158 (two shown) commencing at the proximal end 152 and extending to the distal end 156. The rigid portion 154 supports a flexure 160 upon which the head 114 (of FIG. 1) is preferably mounted. The stiffening rail 158 facilitates conveyance to the head 114 of a load developed by the spring rate of the strut 144.

FIG. 3 also shows a base portion 162 of the damping material support structure 136 preferentially adjacent the proximal end 152 of the load beam region 150. The damping material support structure 136 preferably extends from the base portion 162 into an aperture 164. During formation of the aperture 164, a mounting aperture 166 is preferentially formed in the mounting region 148, and an attachment member 168 is preferably affixed adjacent the mounting aperture 166. The attachment member 168 facilitates mounting of the head suspension 120 to the actuator arm 122 of the actuator 112 (of FIG. 1).

Preferably, the amount of material removed during formation of the aperture 164 substantially determines the dimensions of the strut 144. The dimensions of the strut 144 determines the amount of spring force and load applied to the head 114 (of FIG. 1) to assure the proper fly height of the head 114 during operations of the DSD 100 (of FIG. 1). FIG. 3 further shows, an optional mass adjustment area 170 that may be etched onto the load beam region 150 to decrease the overall mass of the load beam region 150.

Figure 4:
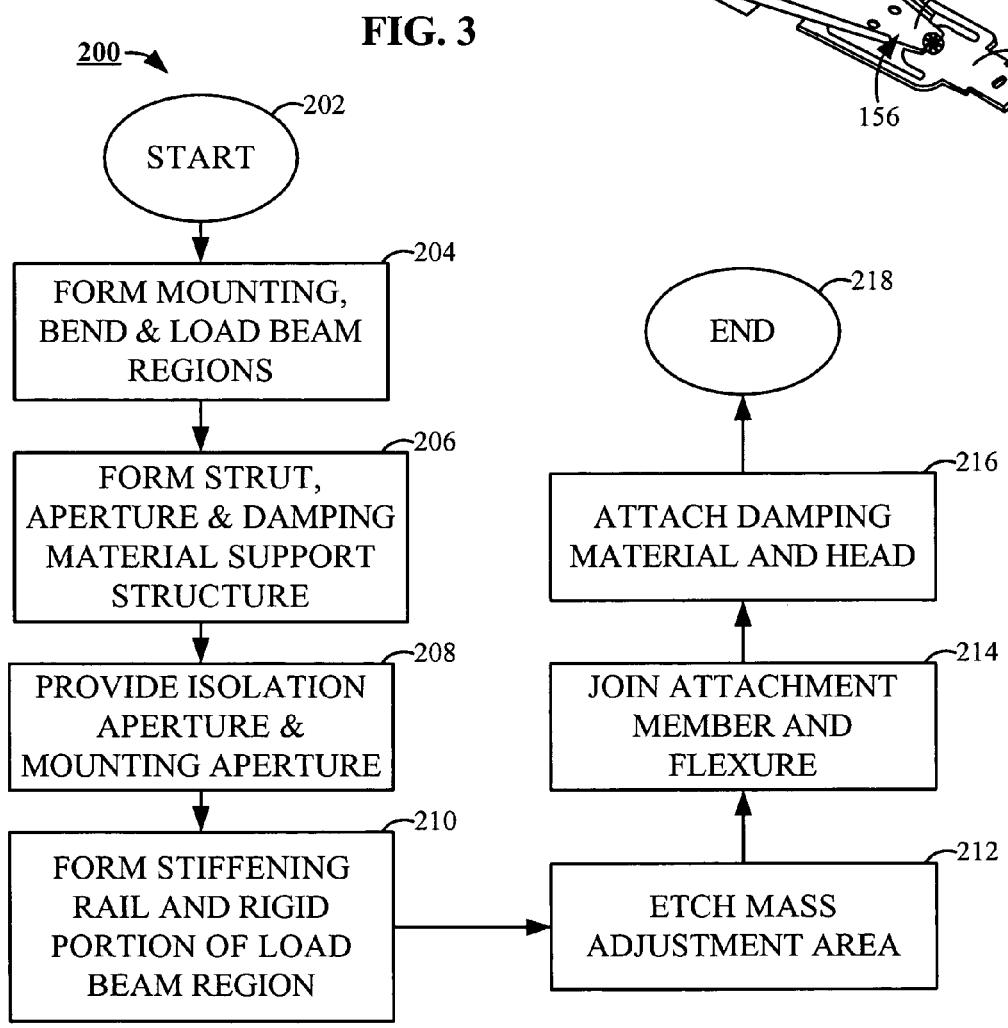
FIG. 4 is a flow chart of a method of forming the head suspension of FIG. 2.

FIG. 4 shows a head suspension formation process 200 beginning at start step 202 and continuing at process step 204. Preferably, at process step 204, a mounting region (such as 148), a bend region (such as 142) and a load beam region (such as 150) are formed. At process step 206, material is removed to preferentially form a strut (such as 144), a damping material support structure (such as 136) and an aperture (such as 164). The amount of material removed during formation of the aperture substantially defines the dimensions of the strut 144, which determines the amount of spring force and load applied to a head (such as 114) of a DSD (such as 100).

At process step 208, a mounting aperture (such as 166) and an isolation aperture (such as 146) are provided by removing material from the mounting region (for the mounting aperture), and from the bend region (for the isolation aperture). The isolation aperture preferably provides a separation between the damping material support structure and the strut to assure non-interference with the operation of the strut by the damping material support structure. An attachment member (such as 168) preferably encloses the mounting aperture and provides a means for mounting the head suspension to an actuator arm (such as 122) of an actuator (such as 112) of the DSD.

At process step 210, a stiffening rail (such as 158) and a rigid portion (such as 154) are preferably formed in the load beam region. The stiffening rail transfers the load developed by the spring force from the strut to the head, and the rigid region supports a flexure (such as 160) used to attach the head. At process step 212, an optional mass adjustment area (such as 170) is etched into the load beam region to reduce the overall mass of the load beam region. At process step 214, the attachment member is joined to the mounting region and the flexure is joined to the rigid portion of the load beam region.

At process step 216, the damping material is attached to the strut and the damping material support structure. Preferably, the damping material exhibits a damping coefficient higher than the damping coefficient of the material adjacent the isolation aperture. Also preferably, the damping material is constructed from layered dissimilar materials. For example, elastomeric materials have been found useful as part of the dissimilar materials used to form the damping materials. The head suspension formation process 200 concludes at end process step 218.

Accordingly, embodiments of the present invention are generally directed to a method (such as 200, as described hereinabove), an apparatus (such as 120), and a combination (such as 100) which includes a rotating disc (such as 110) in a data exchange relationship with a read/write head (such as 114) supported by a head suspension (such as 120) apparatus as formed by the method.

The method preferably includes the steps of; forming a mounting region (such as 148) adjacent a bend region (such as 142) while a load beam region (such as 150) is formed adjacent the bend region (such as by process step 204); removing material (such as by process steps 206 and 208) from the bend region forms an aperture (such as 164), a strut (such as 144), an isolation aperture (such as 146) and a damping material support structure (such as 136). The method preferably continues with the step of affixing a damping material to the strut and the damping material support structure (such as by process step 216).

The apparatus includes the bend region preferably adjacent both the mounting region and the load beam region. The load beam region includes a rigid portion (such as 154), which preferably supports a flexure (such as 160). The flexure provides means for attaching the read/write head to the head suspension. The apparatus further preferably includes the damping material attached to both the strut and the damping material support structure.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A head suspension which supports a data transducer in a data exchange relationship with a storage medium, the head suspension comprising:
   a load beam region comprising a substantially planar portion bounded on opposing sides by respective first and second stiffener rails;
   a bend region comprising first and second strut members extending from said load beam region;
   a mounting region coupled to the first and second strut members to form a central aperture bounded by the mounting region, the first and second strut members and the planar portion of the load beam region;
   a damping material secured to the planar portion of the load beam region between said first and second rails, said material partially spanning the central aperture and
   a damping material support structure which partially supports said layer, the dampening material support structure comprising a cantilever projection which extends from the planar portion of the load beam region into the central aperture between the first and second struts.

2. The head suspension of claim 1, further comprising a head suspended at one end of the planar portion of the load beam region opposite the mounting region.

3. The head suspension of claim 1, wherein the mounting region is coupled to a rigid actuator arm.

4. The head suspension of claim 1, wherein the damping material is secured to the planar portion of the load beam region symmetrically across a longitudinal axis which bisects the planar portion along a length thereof and terminates at a data transducer supported at a distal end thereof.

5. The head suspension of claim 1, wherein the damping material spans a plurality of isolation channels adjacent to the damping material support structure.

6. The head suspension of claim 1, further comprising at least one mass adjustment area which extends through the planar portion of the load beam region.

7. A head suspension which supports a data transducer in a data exchange relationship with a storage medium, comprising:
   a longitudinally extending load beam region which supports the data transducer at a first end thereof, said load beam region comprising a substantially planar portion bounded on opposing sides by respective first and second stiffener rails;
   a bend region extending from the load beam region opposite the data transducer and comprising spaced apart, first and second strut members;
   a mounting region coupled to the first and second strut members opposite the load beam region, wherein a central aperture is formed bounded by the mounting region, the first and second strut members and the planar portion of the load beam region;
   a layer of dampening material affixed to the planar portion of the load beam region between said first and second rails, said layer partially spanning the aperture; and
   a damping material support structure which partially supports said layer, the dampening material support structure comprising a cantilever projection which extends from the planar portion of the load beam region into the central aperture between the first and second struts.

8. The head suspension of claim 7, further comprising a head suspended at one end of the planar portion of the load beam region opposite the mounting region.

9. The head suspension of claim 7, wherein the mounting region is coupled to a rigid actuator arm.

10. The head suspension of claim 7, wherein the damping material is secured to the planar portion of the load beam region symmetrically across a longitudinal axis.

11. The head suspension of claim 7, wherein the damping material spans a plurality of isolation channels adjacent to the damping material support structure.

12. The head suspension of claim 7, further comprising at least one mass adjustment area.

13. A head suspension which supports a data transducer in a data exchange relationship with a storage medium, the head suspension comprising:
   a mounting region configured for attachment to a rigid actuator arm;
   a bend region extending from the mounting region comprising:
   an aperture defined by a plurality of bend members; and
   a cantilevered damping material support structure extending into the aperture to define at least one isolation channel;
   a load beam region adjacent the bend region defined by a plurality of stiffening rails; and
   a damping material secured to the load beam region between the stiffening rails and to the bend region partially spanning the damping material support structure and isolation channels so that a remaining portion of the damping material support structure and isolation channels are not spanned by said damping material.

14. The head suspension of claim 13, further comprising a head suspended at one end of the planar portion of the load beam region opposite the mounting region.

15. The head suspension of claim 13, wherein the mounting region is coupled to a rigid actuator arm.

16. The head suspension of claim 13, wherein the damping material is secured to the planar portion of the load beam region symmetrically across a longitudinal axis.

17. The head suspension of claim 13, wherein the damping material spans a plurality of isolation channels adjacent to the damping material support structure.

18. The head suspension of claim 13, further comprising at least one mass adjustment area.

* * * * *